United States Patent [19]
Jackson

[11] 4,138,852
[45] Feb. 13, 1979

[54] STEAM GENERATION AND POLLUTION CONTROL SYSTEM

[76] Inventor: Dennis H. Jackson, 850 W. Osborn Rd., Phoenix, Ark. 85013

[21] Appl. No.: 823,478

[22] Filed: Aug. 10, 1977

[51] Int. Cl.² .......................... B01F 3/04; F01K 21/00
[52] U.S. Cl. ........................................ 60/670; 60/645; 261/17; 261/DIG. 9
[58] Field of Search .................. 60/648, 649, 670, 643, 60/645, 721, 646, 657; 261/118, 17, DIG. 9

[56] References Cited
U.S. PATENT DOCUMENTS

| | | | |
|---|---|---|---|
| 1,563,125 | 11/1925 | Ward | 261/DIG. 9 |
| 1,641,995 | 9/1927 | Shobrone | 261/DIG. 9 |
| 3,215,523 | 11/1965 | Richardson | 261/DIG. 9 |
| 3,613,333 | 10/1971 | Gardenier | 55/94 X |
| 3,670,669 | 6/1972 | Hoad | 110/234 |
| 3,835,796 | 9/1974 | Sanga | 261/DIG. 9 |
| 3,993,448 | 11/1976 | Lowery, Sr. | 261/DIG. 9 |
| 4,019,444 | 4/1977 | Kleeberg | 261/DIG. 9 |

*Primary Examiner*—Allen M. Ostrager
*Attorney, Agent, or Firm*—Sughrue, Rothwell, Mion, Zinn and Macpeak

[57] ABSTRACT

The heat and flu gases which are ordinarily expelled through an emission stack of a conventional furnace are instead channeled through a heat exchanger to produce steam for power generation and are subsequently directed through a gas scrubber apparatus to remove all contaminates from the flu gas prior to expelling the gases into the atmosphere.

4 Claims, 2 Drawing Figures

STEAM GENERATION AND POLLUTION CONTROL SYSTEM

BACKGROUND OF THE INVENTION

The present invention is directed to the efficient utilization of heat which is ordinarily expelled with the flu gases from large scale furnaces such as blast furnaces, smelters and the like and to the efficient removal of all contaminates from the flu gases subsequent to the utilization of the heat but prior to the expulsion of the gases into the atmosphere.

For many years the hot effluent gases from blast furnaces, smelters and the like were passed through a conventional emission stack directly into the atmosphere. While some of the flu gases having a high BTU value were utilized as pipeline gas for subsequent burning, the heat carried by these gases as they left the furnace was ordinarily dissipated in an extremely wasteful manner. Since the advent of strict pollution controls, most companies have made an effort to remove the contaminates from the effluent gases prior to or during passage of the gases through the emission stack. If the gases pass through various scrubbers or other anti-pollution devices prior to being expelled into the atmosphere, the heat accompanying these gases as they leave the furnace is quickly dissipated during passage through the pollution control devices so that the temperature of the clean gases finally being expelled into the atmosphere is quite low.

In the refinement of metal ores a substantial amount of metal values are carried away with the effluent gases thereby decreasing the efficiency of the smelting operation. The use of electrostatic precipitators was prevalent long before the advent of pollution control for the purpose of capturing some of the metal values from the effluent gases. However, many of the ores were not amenable to electrostatic precipitation and a substantial amount of metal values were irretrievably lost during the smelting operation.

SUMMARY OF THE INVENTION

The present invention provides a new and improved method for the efficient utilization of the furnace heat carried by the effluent gases so that the heat will not be wastefully dissipated directly into the atmosphere or during anti-pollution treatment of the effluent gases. According to the present invention the conventional emission stack commonly used with large scale furnaces such as blast furnaces, smelters and the like is completely eliminated with the high temperature effluent gases being passed directly through a heat exchanger to achieve the efficient utilization of the high temperature prior to passing the effluent gases through an anti-pollution treatment.

The present invention is directed to a new and improved anti-pollution treatment for effluent gases subsequent to the passage of the gases through a heat exchanger whereby substantially all of the contaminates and metal values carried by the effluent gases are captured. As a result, the effluent gases expelled into the atmosphere are substantially clean, low temperature gases. Most importantly, the high temperature effluent gases are efficiently utilized and substantial amounts of metal values are recovered to substantially increase the efficiency of the entire smelting operation.

The present invention provides a new and improved apparatus for the removal of contaminates from the effluent gases comprising a plurality of water-filled tanks each having a zig-zag hollow passage for effluent gases disposed vertically above the water level. The lowest leg of each zig-zag column is disposed horizontally with the bottom surface thereof opened and submerged beneath the water level. A system of conduits, valves and blowers selectively direct the effluent gases from a furnace subsequent to passage through a heat exchanger to one of the zig-zag columns. The effluent gases enter each column adjacent the lower leg thereof and exit through an aperture at the upper most end of the top leg. Pump and conduit means are provided for pumping water from the tank to the upper end of the zig-zag column adjacent the exit aperture for the gases and water is continuously sprayed into the zig-zag column by means of a zig-zag spray pipe which is coextensive in length with the zig-zag column and disposed interriorly thereof. The diameter of the pipe decreases from the upper end to the lower end in stages to maintain the spray pressure evenly throughout the length of the spray pipe.

The foregoing and other objects, features and advantages of the invention will be apparent in the following more particular description of a preferred embodiment of the invention as illustrated in the accompanying drawings.

DETAILED DESCRIPTION OF THE PREFERRED EMBODIMENT

Figure 1:
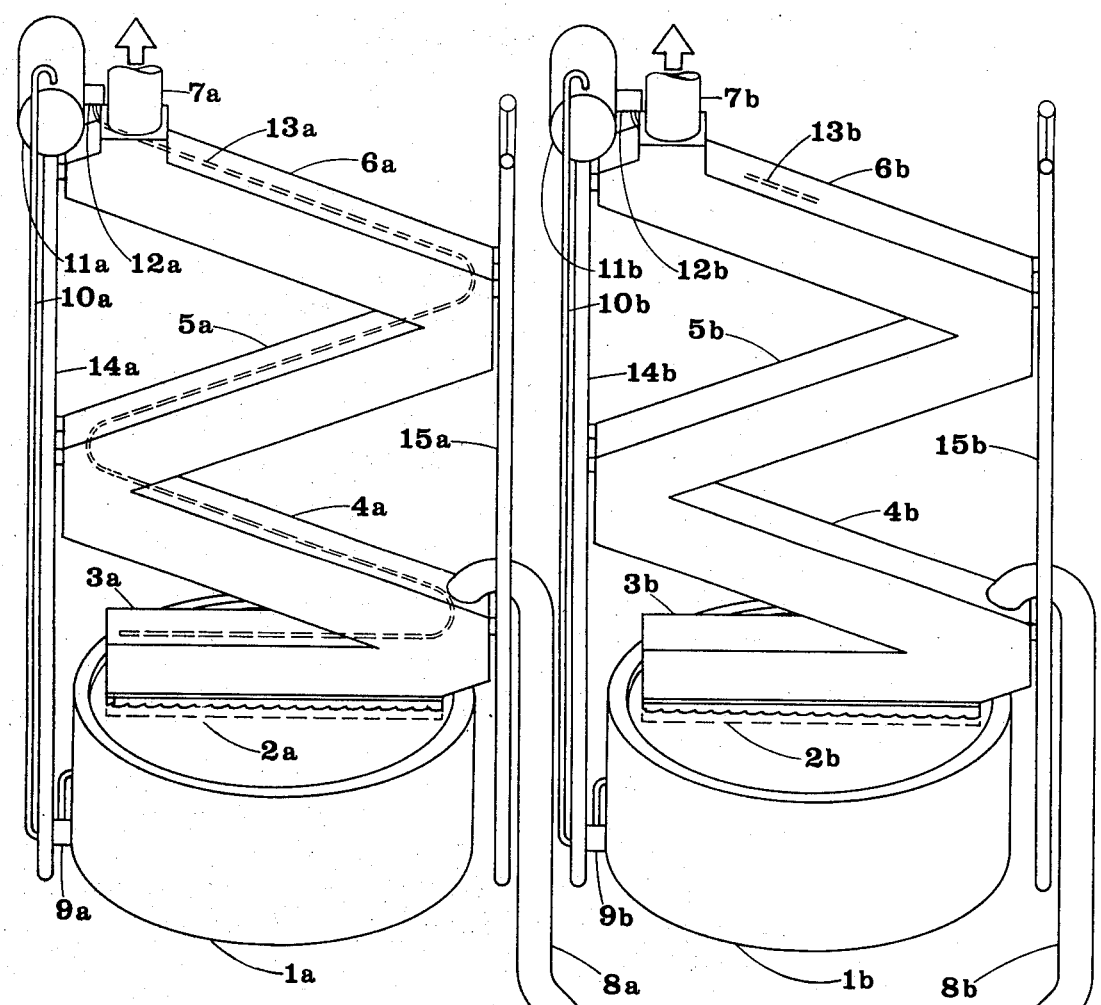
FIG. 1 is a schematic view of the anti-pollution scrubber system according to the present invention showing two water tanks and the scrubbing apparatus for effluent gases associated with each tank and the valves, conduits and blowers for selectively directing the effluent gases to said tank.
Figure 2:
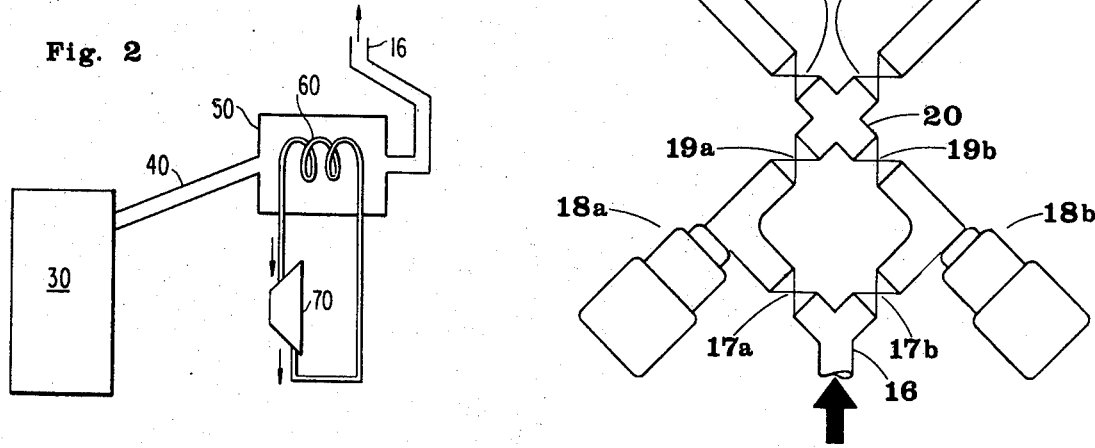
FIG. 2 is a schematic view of a furnace, heat exchanger, power emans and the conduit arrangement interconnecting these elements and leading to the apparatus of FIG. 1.

The large scale furnace such as a blast furnace, smelter or the like and an associated heat exchanger are shown schematically in FIG. 2. Assuming the furnace 30 to be a blast furnace, the top of the furnace is sealed and the conventional upcomer 40 is connected directly to a heat exchanger 50. The heat exchanger can be of any conventional type wherein the hot effluent gases will enter at one end and exist at the opposite end subsequent to passing over some form of heat transfer apparatus such as the steam coil 60 shown schematically in FIG. 2. The higher temperature of the hot effluent gases will convert water to steam in the coil 60 and the steam will be passed through a turbine 70 for the production of power. The steam/condensate exiting from the turbine 70 is then re-cycled through the heat exchanger coil 60. The effluent gases then exit by way of conduit 16 to the anti-pollution scrubber arrangement shown in FIG. 1.

The effluent gases carried by the conduit 16 still contain all of the contaminates and in the case of a metal smelting operation would also carry a substantial amount of metal values. As best seen in FIG. 1, the conduit 16 terminates in a Y connection with valves 17a and 17b connected to each branch of the Y connection, respectively. The opposite ends of the valves 17a and 17b are connected to L-shaped conduit sections each having a blower 18a and 18b connected thereto at the bend of the L-shaped conduit. The opposite ends of the L-shaped conduit sections are connected to valves 19a and 19b which, in turn, are connected to a cross-shaped conduit section. An additional valve 21a is connected to the cross-shaped conduit section directly opposite the valve 19b and a valve 21b is connected to the cross-shaped conduit section directly opposite the valve 19a. The valves 21a and 21b are connected to conduits 8a and 8b, respectively, which lead to the scrubber columns associated with water tanks 1a and 1b, respectively.

Each water tank 1a and 1b is filled to a predetermined level with water and a zig-zag shaped hollow column is supported above the water level of each tank by means of vertical support posts 14a, 15a, 14b and 15b. Since the system associated with each tank is identical, the detailed description will be limited to the left-hand tank 1a.

The zig-zag column is comprised of a lower leg 3a having a rectilinear cross-section. The leg 3a is disposed horizontally with the bottom wall completely opened and submerged below the surface of the water at 2a. The conduit 8a is connected to the lower-most end of the diagonal leg 4a adjacent the intersection of the leg 4a with the leg 3a. Two additional diagonal legs 5a and 6a are connected in sequence and a vent conduit 7a is connected to the interior of the column at the top of the leg 6a. The cross-section of each of the legs is rectilinear although other cross-sectional configurations could be utilized. A spray pipe 13a is located within the hollow column and is disposed in a complimentary zig-zag fashion throughout the entire length of the column. The spray pipe 13a is provided with a plurality of perforations along the entire length thereof and the diameter of the spray pipe 13a is progressively reduced in each oppositely directed leg thereof so that the pressure will be maintained substantially equally throughout the entire length of the spray pipe so that a sufficient volume of water under sufficient pressure will be sprayed through the effluent gases along the entire length of the column. A conduit 10a having a pump 9a associated therewith conveys the water from the tank 1a to an upper reservoir 11a. A spray pump 12a is associated with the reservoir 11a for pumping the water from the reservoir 11a through the spray pipe 13a.

The actual dimensions of the zig-zag column can vary greatly but it is contemplated that an efficient apparatus would be provided if the cross-section of each leg is approximately 4 feet square with each of the inclined legs having a downward ratio of 2 inches to the foot to allow for fast drainage of the spray liquid down into the tank section. The diameter of the tank would be approximately 50 feet and the length of each of the inclined sections of the zig-zag conduit would be approximately 60 feet. All the welds of the zig-zag column should be sufficient to prevent the penetration of gases or liquids and the interior of the column could be provided with an appropriate liner such as rubber or glass to prevent corrosion of the metal column by means of acids in the gaseous effluence. The spray pipe would have a 4 inch diameter in the top leg 6a, a 3 inch diameter in the second leg 5a, a 2 diameter in third leg 4a and a one inch diameter in the bottom horizontal leg 3a. It is also conceivable that the column could also have an entirely different configuration such as a spiral and that the spray pipe would have a complimentary shape. While two tanks and columns have been shown by way of example, it is also conceivable that any number of tanks and columns could be utilized depending upon the volume of effluent gases to be handled. It is, however, essential that there be at least two tank and column arrangements whereby one of the columns can serve as a backup for the other in the event of failure or during cleaning of one tank and column so as to remove the contaminates from the tank and to recover the metal values captured therein. It is also possible to provide a moving bucket arrangement (not shown) which could be disposed in the water tanks for removing the contaminates which settle to the bottom thereof.

In the operation of the total system shown in FIGS. 1 and 2, the furnace 30 is operated in the conventional manner depending upon the type of furnace. However, instead of exhausting the effluent gases directly into the atmosphere through an emission stack, the total volume of effluent gases is contained and channeled directly into a heat exchanger 50 whereby the heat is utilized to generate steam for the purpose of power generation. In the case of an average smelter, the surface temperature in the furnace would be around 2200° F and the effluent gases would be discharged at the top of a conventional emission stack at a temperature of around 720° F. Thus, the temperature of the effluent gases passing through the heat exchanger would be of approximately the same order enabling the operation of a power plant which would range in size from 15 megawatts to 750 megawatts depending upon the size of the location involved and the total volume of effluent gases being effectively utilized. The effluent gases which exit from the heat exchanger pass through the conduit 16 to the multiple valve arrangement associated with the blowers for the selective distribution of the gases to one of the tank and scrubber column arrangements. For example, if it is desired to direct the effluent gases to the tank 1a and the associated scrubber column, the valves 17a, 19a and 21b will be closed and the valves 17b, 19b and 21a will be opened. The blower 18b which blows a stream of air toward the valve 19b past the valve 17b will draw the effluent gases from the conduit 16 into the steam of air which will pass through the conduit 8a into the zig-zag column above the tank 1a. The blowers 18a and 18b are variable speed so that the amount of suction in the line 16 can be controlled furnace 30. will, in turn, effectively control the draft in the furnace30. This will provide a much more accurate control over the combustion process within the furnace than the conventional emission stack which creates an erratic draft depending upon the velocity of airflow over the mouth of the emission stack.

In summary, the process and apparatus according to the present invention accomplish three specific goals. First, the vast quantity of heat ordinarily wasted in the effluent gases of a large scale furnace is effectively utilized for the production of steam generated electrical power. Secondly, control over all pollution is achieved by the scrubber arrangement for the effluent gases. Thirdly, the scrubber system of the present invention provides for the recovery of all metal values which would ordinarily be lost thereby increasing the efficiency of the entire smelting operation. The system, however, can also be used with other types of furnaces which are not involved in the refining of metal ores and therefore, only the first two goals would be accomplished.

Depending on the type of ore being smelted, the effluent gases might contain varying amounts of sulfurous compounds which if contacted with a water spray at high temperatures would produce a mist of sulfuric acid which could cause serious damage if allowed into the atmosphere from the top of a conventional emission stack. However, according to the present invention, the temperature of the effluent gases exiting from the heat exchanger will be low enough to prevent the formation of steam upon contact with the water spray in the zig-zag column. Furthermore, in the event that any sulfuric acid is formed in the lower legs of the zig-zag column, the tortuous course of the gases and the additional spraying in the upper legs will absolutely prevent any acid emission from the top of the column.

While pure water is generally adequate as the spraying agent, it is possible to use additives such as reagent chemicals or gylcols for surface tension control.

While the invention has been particularly shown and described with reference to a preferred embodiment thereof, it will be understood by those skilled in the art that various changes in form and details may be made therein without departing from the spirit and scope of the invention.

What is claimed is:

1. A method for the effective utilization and cleaning of high temperature effluent gases from a furnace comprising capturing all of the effluent gases eminating from the furnace, directing said effluent gases through a heat exchanger for the production of steam generated power, and subsequently passing said gases through contaminate removal means prior to expulsion of the gases into the atmosphere, wherein the passage of said effluent gases through contaminate removal means is accomplished by passing said gases upwardly through a hollow zig-zag column, the lower end of which is emersed in a tank of water, while continuously spraying water into said gases along the entire length of said column to precipitate all contaminates and metal values into said water tank and discharging the clean effluent gases into the atmosphere at the top of said column.

2. An apparatus for the effective utilization and cleaning of high temperature effluent gases from a furnace comprising means for collecting all the effluent gases from a furnace, heat exchanger means, gas scrubber means and conduit means for passing said gases through said heat exchanger means prior to passage through said scrubber means, wherein said gas scrubber means includes a plurality of water tanks, a hollow zig-zag column supported vertically above the tank, said column having a lower horizontally disposed leg with the bottom thereof open and submerged below the surface of the water in the tank, distribution means for selectively directing the effluent gases from said heat exchanger means into the bottom of one of said columns, spray means dispersed within said column and extending the entire length thereof, pump means for pumping water from said tank through said spray means and aperture means at the top of said column for discharging clean gases to the atmosphere.

3. An apparatus as set forth in claim 2, wherein said distribution means is comprised of a plurality of suction-blower means for drawing the effluent gases from the furnace and heat exchanger means and blowing said gases into a selected tank and valve means for directing the flow of said gases.

4. An apparatus as set forth in claim 2, wherein said spray means is comprised of a pipe having a plurality of perforations along the length thereof with the diameter of said pipe in each oppositely directed leg of said zig-zag column decreasing from top to bottom to maintain an even pressure throughout the length of the pipe.

* * * * *

UNITED STATES PATENT AND TRADEMARK OFFICE
CERTIFICATE OF CORRECTION

PATENT NO. : 4,138,852
DATED : February 13, 1979
INVENTOR(S) : Dennis H. JACKSON It is certified that error appears in the above–identified patent and that said Letters Patent are hereby corrected as shown below:

In the inventor's address, delete "Ark." and insert therefor --Arizona--.

Signed and Sealed this

Fifth Day of June 1979

[SEAL]

Attest:

RUTH C. MASON
*Attesting Officer*

DONALD W. BANNER
*Commissioner of Patents and Trademarks*